United States Patent
Den Herder et al.

(10) Patent No.: US 9,311,726 B2
(45) Date of Patent: Apr. 12, 2016

(54) SYSTEM AND METHOD FOR MAPPING AND COMPARING CHOROPLETHIC HOUSING STATISTICS

(75) Inventors: Nathan P. Den Herder, Falls Church, VA (US); Rebecca F. Adler-Stratford, Washington, DC (US); Silviu C. Marghescu, Palo Alto, CA (US); David A. Talbird, Bronx, NY (US); Eric Rosenblatt, Derwood, MD (US)

(73) Assignee: Fannie Mae, Washington, DC (US)

( * ) Notice: Subject to any disclaimer, the term of this patent is extended or adjusted under 35 U.S.C. 154(b) by 224 days.

(21) Appl. No.: 13/599,009

(22) Filed: Aug. 30, 2012

(65) Prior Publication Data

US 2014/0063020 A1    Mar. 6, 2014

(51) Int. Cl.
*G06T 11/20*    (2006.01)

(52) U.S. Cl.
CPC .................... *G06T 11/206* (2013.01)

(58) Field of Classification Search
CPC ....................................................... G06T 11/20
USPC ....................................................... 345/441
See application file for complete search history.

(56) References Cited

U.S. PATENT DOCUMENTS

| | | |
|---|---|---|
| 5,361,201 A | 11/1994 | Jost et al. |
| 5,966,700 A | 10/1999 | Gould et al. |
| 7,099,843 B1 | 8/2006 | Cassidy et al. |
| 7,289,965 B1 | 10/2007 | Bradley et al. |
| 7,340,431 B1 | 3/2008 | McManus et al. |
| 7,451,095 B1 | 11/2008 | Bradley et al. |
| 7,509,261 B1 | 3/2009 | McManus et al. |
| 7,593,890 B1 | 9/2009 | Bradley et al. |
| 7,647,272 B1 | 1/2010 | Muren |
| 7,693,764 B1 | 4/2010 | Gordon et al. |
| 7,711,574 B1 | 5/2010 | Bradley et al. |
| 7,792,742 B1 | 9/2010 | Thomas et al. |
| 7,797,166 B1 | 9/2010 | Bradley et al. |
| 7,835,919 B1 | 11/2010 | Bradley et al. |
| 7,882,025 B1 | 2/2011 | Seal et al. |
| 7,904,381 B1 | 3/2011 | Tatang et al. |
| 7,941,365 B1 | 5/2011 | Bradley et al. |
| 7,941,366 B1 | 5/2011 | Bradley et al. |
| 7,945,510 B1 | 5/2011 | Bradley et al. |

(Continued)

FOREIGN PATENT DOCUMENTS

| | | | | |
|---|---|---|---|---|
| KR | 100782151 B1 | * | 12/2007 | ............... G06F 19/00 |
| KR | 100782151 B1 | * | 12/2007 | ............... G06F 19/00 |

OTHER PUBLICATIONS

G. Andrienko et al., Internet mapping for dissemination of statistical information, Computers, Environment and Urban Systems, vol. 23, Issue 6, Nov. 30, 1999, pp. 425-441.*

(Continued)

*Primary Examiner* — Phi Hoang
*Assistant Examiner* — Jitesh Patel
(74) *Attorney, Agent, or Firm* — Michael Best & Friedrich LLP (57) ABSTRACT

The present invention relates to a mapping and comparing choroplethic housing statistics. In one example, this comprises accessing property data corresponding to a geospatial area. Analytics are used to generate usable property data statistics from the accessed property data. A thematic map image based on the usable property data statistics is then generated according to comparison categories, so that the thematic map image may be displayed.

19 Claims, 8 Drawing Sheets

(56) References Cited

U.S. PATENT DOCUMENTS

| | | | |
|---|---|---|---|
| 7,974,854 B1 | 7/2011 | Bradley et al. | |
| 7,987,137 B1 | 7/2011 | Thomas et al. | |
| 7,996,304 B1 | 8/2011 | Thomas et al. | |
| 7,996,313 B1 | 8/2011 | McMurray et al. | |
| 8,010,377 B1 | 8/2011 | Bradley et al. | |
| 8,046,306 B2 | 10/2011 | Stinson | |
| 8,108,302 B1 | 1/2012 | Bradley et al. | |
| 8,140,421 B1 | 3/2012 | Humphries et al. | |
| 8,209,258 B1 | 6/2012 | Seal et al. | |
| 8,239,318 B1 | 8/2012 | Bradley et al. | |
| 8,244,563 B2 | 8/2012 | Coon et al. | |
| 8,255,320 B1 | 8/2012 | Seal et al. | |
| 8,280,806 B1 | 10/2012 | Bradley et al. | |
| 8,326,749 B1 | 12/2012 | Seal et al. | |
| 8,386,395 B1 | 2/2013 | Gordon et al. | |
| 8,401,868 B1 | 3/2013 | Bradley et al. | |
| 8,401,961 B1 | 3/2013 | McMurray et al. | |
| 8,447,688 B1 | 5/2013 | Thomas et al. | |
| 8,521,644 B1 | 8/2013 | Hanson et al. | |
| 2001/0015733 A1* | 8/2001 | Sklar | G06F 17/30241 715/853 |
| 2005/0154656 A1 | 7/2005 | Kim et al. | |
| 2005/0154657 A1 | 7/2005 | Kim et al. | |
| 2006/0200384 A1* | 9/2006 | Arutunian et al. | 705/14 |
| 2007/0247462 A1* | 10/2007 | Bell et al. | 345/440 |
| 2008/0004893 A1 | 1/2008 | Graboske | |
| 2008/0059205 A1* | 3/2008 | Dayan et al. | 705/1 |
| 2008/0059889 A1* | 3/2008 | Parker et al. | 715/748 |
| 2009/0254841 A1* | 10/2009 | Balaishis et al. | 715/753 |
| 2010/0036750 A1* | 2/2010 | Whelan | G06F 17/30241 705/26.1 |
| 2011/0270705 A1* | 11/2011 | Parker | G06F 17/30241 705/26.61 |
| 2012/0089920 A1* | 4/2012 | Eick | G08G 1/20 715/739 |
| 2013/0067379 A1* | 3/2013 | Chutkay et al. | 715/771 |
| 2013/0156318 A1* | 6/2013 | Beckman | 382/190 |

OTHER PUBLICATIONS

Gunjan Dang et al, Dynamic Queries and Brushing on Choropleth Maps, IEEE Proceedings of the Fifth International Conference on Information Visualisation, Jul. 25, 2001.*

Web archive of DataViz (May 13, 2011 web archive snapshot of "www.improving-visualisation.org/vis/id=203").*

"Sharing ArcView Themes for Interactive Exploration", Proceedings of ESRI European User Conference, Nov. 15-17, 1999, Munich, Germany.*

"Conjunction_Definition", screen captures of two dictionary definitions of, in conjunction with.*

"Interactive map of the drug war in Mexico", screen capture of the video demo on ekonlab.com/?p=146, Mar. 19, 2012.*

Vandell, Kerry D. "Optimal Comparable Selection and Weighting in Real Property Valuation" AREUEA Journal, vol. 19, No. 2, 1991, pp. 213-239.

Gau, George W., et al. "Optimal Comparable Selection and Weighting in Real Property Valuation: An Extension" Journal of the American Real Estate and Urban Economics Association vol. 20, No. 1, 1992, pp. 107-123.

* cited by examiner

SYSTEM AND METHOD FOR MAPPING AND COMPARING CHOROPLETHIC HOUSING STATISTICS

BACKGROUND OF THE INVENTION

1. Field of the Invention

This application relates generally to comparing statistical data on the housing market with geospatial mapping.

2. Description of the Related Art

Housing market information purchased from housing market entities (such as, Mortgage Brokers Association and First American CoreLogic) is used to analyze housing market trends. Further, maps specially designed to show particular housing market trends connected with specific geographic areas may sometimes be created and viewed individually to analyze housing market trends. However, because housing market information itself does not present coherent and readily attainable statistics without further manipulation and because such maps are subject to geographic and comparison limitations, a comprehensive multiple thematic map approach is needed to interpret statistical housing data concerning geographic areas.

SUMMARY OF THE INVENTION

The present invention relates to a mapping and comparing choroplethic housing statistics. In one example, this comprises accessing property data corresponding to a geospatial area. Analytics may be used to generate usable property data statistics from the accessed property data. A thematic map image based on the usable property data statistics is then generated according to comparison categories, so that the thematic map image may be displayed.

The described invention may be embodied in various fauns, including business processes, computer implemented methods, computer program products, computer systems and networks, user interfaces, application programming interfaces, and the like.

BRIEF DESCRIPTION OF THE DRAWINGS

These and other more detailed and specific features of the described are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, to provide an understanding of one or more embodiments. However, it is and will be apparent to one skilled in the art that these specific details are not required to practice the described invention.

Financial and housing market information itself does not present coherent and readily attainable statistics without further manipulation. The present invention relates to fitting housing market data, derivations from housing market data, and other statistics relevant to the housing market to defined geospatial areas. Specifically, this invention allows users to create maps and tables using any available data to clearly illustrate unique geographic patterns that would not otherwise be visible using the financial and housing market data alone.

Further, users may be able to simultaneously produce on a single display screen at different levels of aggregation thematic maps, which is a type of map or chart designed to show a particular theme connected with a specific geographic area, and choroplethic maps, which is a type of thematic map in which areas may be shaded or patterned in proportion to the measurement of the statistical variable being displayed on the map.

Furthermore, users may be able to combine geospatial mapping with financial and housing market statistical data to produce corresponding tables Financial and housing market data may also be added to the tables in accordance with aggregation levels (e.g. geographic aggregation levels such as region, state, metropolitan statistical area (MSA), county, zip code, and census tract). The table data may further be selected and displayable using color coded rankings, in accordance with thematic and choroplethic maps. The rankings displayed may be based on the user-selected number of ranks (e.g. five or ten) and designated regions (e.g. national region or within a parent geographic region). Thus, users may be able to compare an multiple maps at the same time while viewing multiple financial indicators and tables in support of housing market decision-making.

In one embodiment, the present invention provides a method for mapping and comparing choroplethic housing statistics includes accessing database information containing property data, such as demographic, economic, and lending information used in the housing market (e.g. financial and housing market data). The database information generally corresponds to geospatial areas; however, when information necessary for mapping and comparing choroplethic housing statistics does not possess this correspondence, the method may interpolate such correspondence. In addition, the geospatial areas, which relate to specific geographic regions or statistical regions, is alterable at anytime during user operation.

After accessing the database information, analytics that ensure usability of the property data may be performed on the property data. Whether before, during, or after the property data is "cleaned," the method may also perform analytics on the property data to derive statistics that may not be directly reported by the property data regions. For example, derived statistics may be summary statistics such as calculating an average home price for a given region. Although different calculations may be employed, it is preferred that a mean or median is used for given values in each region.

Next, the available data (i.e. the usable property data) is used to generate and display thematic maps. Preferably, the available data is used to generate a thematic map based on dispersing within the aggregation levels the data according to a selected comparison category across the geospatial area. The thematic maps may also be generated by combining previously generated maps to derive new thematic maps that display data not shown by the previously generated maps. In addition to the thematic maps, choroplethic maps may also be generated in accordance with at least one of a set of comparison categories (e.g., Roll Rates, SDQs, and Delinquent Loans). The comparison categories will use color codes to display patterned areas in proportion to the statistics. The method also supports display of multiple maps with unique filters for each map, and a new map may be generated whenever the filters are changed. The displaying of multiple maps may be in any orientation, such as side-by-side or over-under. Yet, it is preferred that a side-by-side orientation is a default implementation where each map has an equivalent size and it is also preferred that when a new map is created the existing maps resize to accommodate the addition of the new map for simultaneous comparison.

Furthermore, the method will generate tables that combine the geospatial area and the property data statistics and that correspond to the thematic maps. Thus, all calculations that have already been performed for the thematic maps will be part of respective tables. In addition, after a table is generated, additional property data may be added to the table in accordance with the aggregation levels. The integration between the maps and tables will be performed so that in response to clicking on particular locations in a map, a table or graph showing a comparison between the mapped statistical values at the selected locale (and other selected parent statistics) is displayed. Additionally, the table or graph will display more locations as additional lines are generated with the numbers of other locations as these locations are clicked.

A preferred way of implementing the above example is to use a mobile application installed on a terminal computer for thematic map and table generation as described above. However, a terminal computer is not the only contemplated computer system. Any computer system, such as a laptop personal computer or a handheld portable computer (i.e., tablets, PDAs, cell phones, mobile phones, smart-phones, super-phones, etc.) may be implemented. Further, the functions described herein may be implemented on any conventional computing or electronic device, such as personal computer, conventional desktop computer, a network computer, or any of the various execution environments that will be readily apparent to the artisan and need not be named herein.

The computer system runs any conventional operating system through the interaction of the CPU (or GPU) and the memory to carry out the described functionality by execution of computer instructions. Operating systems may include but are not limited to iOS, Android, Windows, Unix, Linux, Macintosh, or the like. The computer system may further implement applications that facilitate calculations. The memory may be any memory suitable for storing data, such as any volatile or non-volatile memory, whether virtual or permanent, or any other non-transitory computer readable medium (i.e., compact disk, hard disk, etc.). Preferably, the memory stores the choroplethic comparison application, which comprises program code that is executable by the processor to perform operations in support of supplying automatic promotions to the user. Therefore, the application is preferably provided as software on the computer system described above, yet it may alternatively be hardware, firmware, or any combination of software, hardware, and firmware. Still other embodiments include computer implemented processes described in connection with FIGS. 3A-B through 5.

The artisan will readily recognize the various alternative programming languages and execution platforms that are and will become available, and the described is not limited to any specific execution environment. The mapping and comparing choroplethic housing statistics features will now be described in further detail through the below examples.

The choroplethic comparison application includes program code executable by the terminal computer to perform operations for thematic map and table generation as described above. The choroplethic comparison application gathers data concerning the housing market and inserts the data into a database. Then, the choroplethic comparison application performs analytics on the data to ensure usability or to derive statistics that may not be directly reported. Note, the uppermost level of the choroplethic comparison application allows new maps to be created, provides a function to arrange all current maps, allows links showing all current maps to be sent via e-mail, and creates bookmarks in browsers for any link that is be e-mailed.

After the choroplethic comparison application generates a new map, the new map window has a menu that allows control over which geographical and statistical regions may be displayed in the map, which statistics or derived calculations will be compared in those regions, whether five or ten bins (color codes or patterns) will be used in the map, and which month's data should be used. Statistical regions may be any geographic region, with the most common being states, counties, and zip codes, and statistical regions may use arbitrary boundaries that take on any shape. Maps may also compare regions by different criteria utilizing color code assignments. Thus, although counties in one state may be colored relative to counties nationally by default, counties may also be colored relative to counties in their respective state.

Figure 1A:
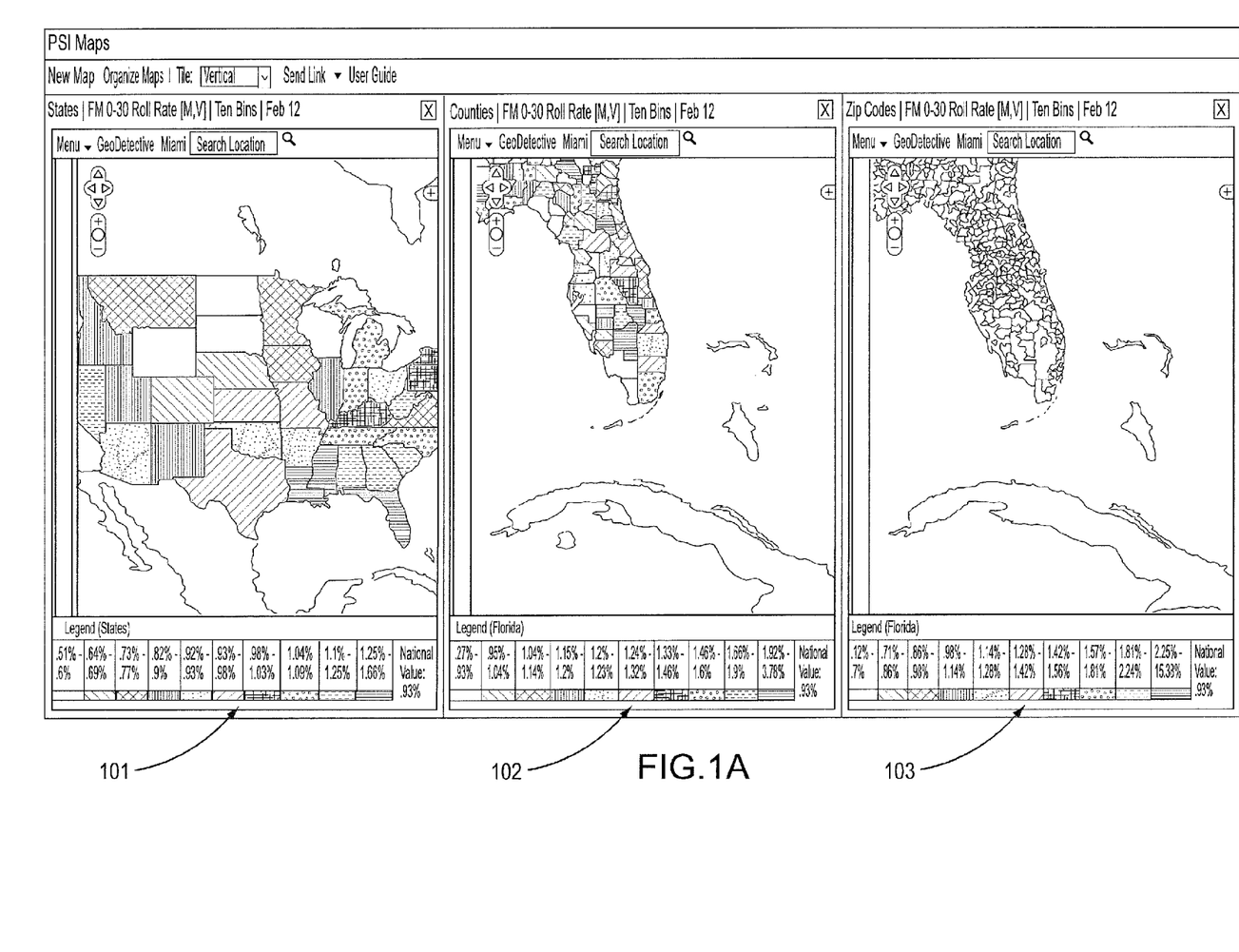
FIG. 1A-B are display diagrams illustrating examples of displays by a choroplethic comparison application.
Figure 1B:
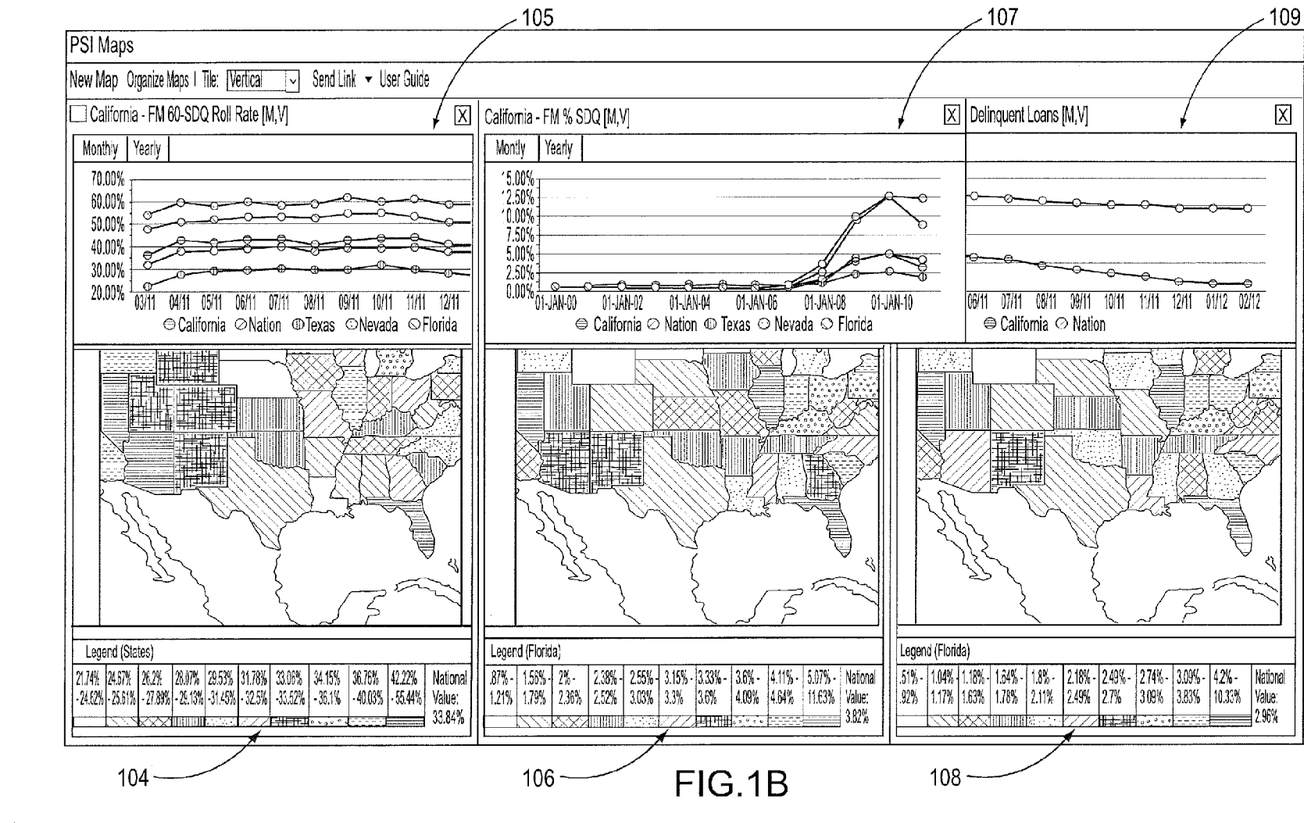

FIGS. 1A-B are display diagrams illustrating examples of displays generated by a choroplethic comparison application. FIG. 1A is a display generated by the choroplethic comparison application where three separate maps are generated corresponding to the United States with States colored according to national "Roll Rate" rankings 101, to Florida with counties colored according to in State "Roll Rate" rankings 102, and to Florida with Census Tracts colored according to in State "Roll Rate" rankings 103 (different colors are indicated as different patterns in the figures). FIG. 1A illustrates simultaneous display of multiple maps, each with different characteristics and different time periods, generated from the clean and new data. These maps act independently of each other and may be capable of allowing a user to compare a statistic over times or regions while showing multiple statistics. Further, the multiple maps 101, 102, and 103 have unique filters that alter the choroplethic patterns whenever the filters may be changed.

FIG. 1B is a display diagram illustrating a display generated by the choroplethic comparison application where three separate maps corresponding to the United States with States colored according to national "Roll Rates" rankings 104, to the United States with States colored according to national "SDQ" rankings 106, and to the United States with States colored according to national "Delinquent Loan" rankings 108. The choroplethic comparison application is also configured to receive a selection of a number of buckets or bins into which the property data statistics may be divided, with a corresponding thematic map image being displayed according to the selected number of bins. This allows the user to customize the level of granularity at which the map image will distinguish geographic areas according to where they rank or reside according to selectable property data statistics. For example, the illustrated maps (and those illustrated in FIG. 1A) were designated to have 10 bins to display the choroplethic patterns. That is, the 10 bins fit the relative housing market data regarding "Roll Rates" rankings, national "SDQ" rankings, and national "Delinquent Loan" rankings into the national and state geospatial areas.

Further, since the choroplethic comparison application displays graphs based on locations selected within each map, graphs of the market data values may be created by clicking on a particular colored region. That is, Roll Rate Graph 105 includes line graphs illustrating the Roll Rate over time for selected regions or locations. In United States Map 104, the locations of California, Nation (the United States as a whole), Texas, Nevada, and Florida were selected and thus their respective line graphs are displayed on Roll Rate Graph 105. Similarly, California, Nation, Texas, Nevada, and Florida were selected on United States Map 106 to produce SDQ Graph 107, while California and Nation were selected on United States Map 108 to produce Delinquent Loan Graph 109. For any one of the graphs 105, 107, and 109, additional regions may be added to the graph by clicking on them after that graph window has been opened.

Accordingly, the graphs and maps (104-109) may be simultaneously produced on a single display screen at different levels of aggregation, and users may combine the selectable regions of the maps and selectable trends shown on the graphs with other statistical data to produce corresponding maps, graphs, and tables to illustrate additional trends and patterns within the geographic areas. Further, additional financial and housing market data may then be added to those tables in accordance with aggregation levels, such as property data that has been cleaned or ensured as usable. Thus, in each display generated by the choroplethic comparison application, the maps, graphs, and tables may be integrated so that they perform further statistical generations, which may be displayed thematically, in response to clicking on particular locations in the maps, tables, or graphs. For instance, the state of Texas may be clicked on in each map 104, 106, and 108 to generate a graph that depicts the corresponding statistical trends for the state of Texas.

In addition, the choroplethic comparison application may examine housing data and summarize any number of statistics for display. Thus, although only a few statistics have been identified via FIGS. 1A-B, the choroplethic comparison application may analyze and summarize data using the hundreds of statistics available to the choroplethic comparison application.

Figure 2A:
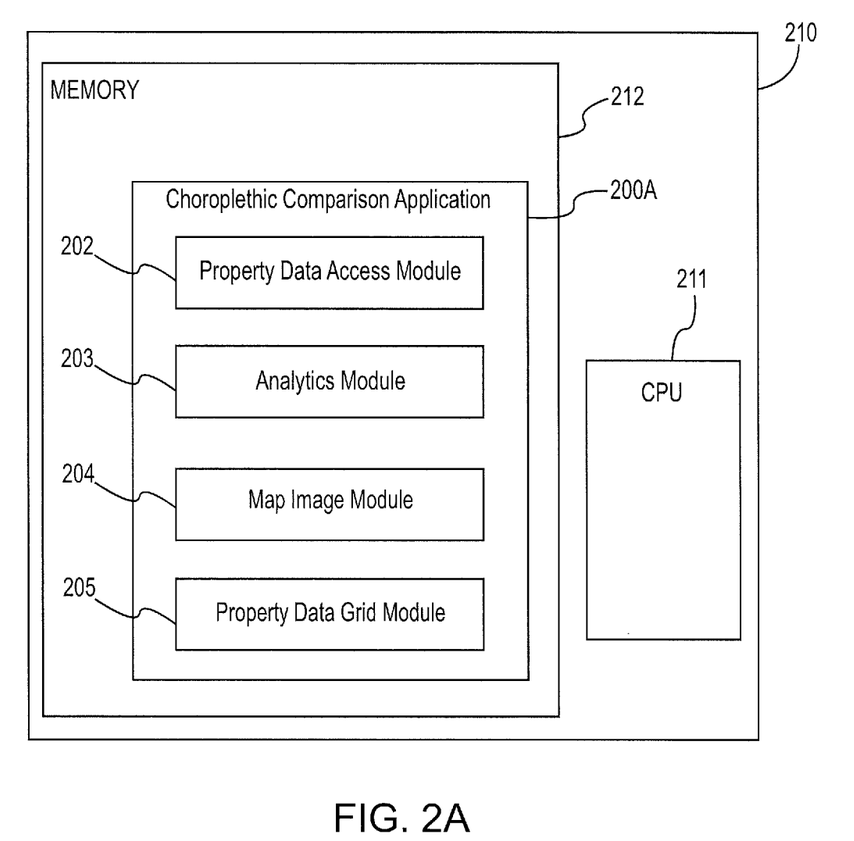
FIGS. 2A-B are block diagrams illustrating examples of a choroplethic comparison application.
Figure 2B:
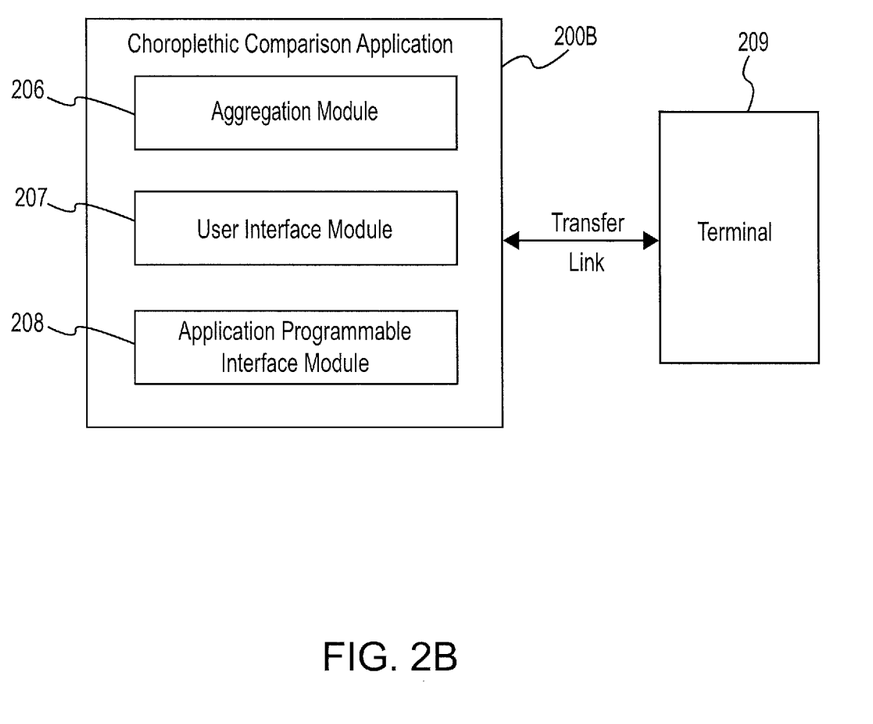

FIGS. 2A-B are block diagrams illustrating examples of a choroplethic comparison application. Specifically, FIG. 2A is a block diagram illustrating an example of an electronic device 210 that comprises a choroplethic comparison application 200A stored on a memory 212 and storing program code that is executable by a central processing unit (CPU) 211 to perform operations of accessing property data, producing usable data, and generating maps and tables, as described above. Alternatively, the electronic device 210 may be any of the computer systems described above, and further the choroplethic comparison application 200A may be implemented in any of the systems (350A and 350B) described below. Further, the choroplethic comparison application 200A is preferably provided as software, but may alternatively be provided as hardware or firmware, or any combination of software, hardware and/or firmware.

The application 200A is configured to provide the functionality of accessing property data, producing usable data, and generating maps and tables through the modules listed below. The example of the application 200A of FIG. 2A includes a property data access module 202, an analytics module 203, a map image module 204, and a property data grid module 205. Although one modular breakdown of the application 200A is offered, it should be understood that the same functionality may be provided using fewer, greater, or differently named modules. Additionally, the functionality of application 200A and the modules respective to that functionality may be provided on different devices, as individual software applications, or a combination of different devices and individual software applications, which is further described herein.

The property data access module 202 includes program code for carrying out access to and management of the property data, whether from internal or external resources.

The analytics module 203 includes program code for applying analytics that ensure the usability of the property data and to derive statistics that may not be directly reported by the property data regions.

The map image module 204 includes program code for accessing mapping functions, for displaying a map image corresponding to the geospatial area, and for managing the depiction of the map images and graphs indicative of the subject property data, as well as rankings and patterns. Further, the map image module 204 may display the property data within the defined geographic area with demarcations of the defined geographic area (e.g., highlighted boundaries) as the neighborhood of interest. The neighborhood may be defined by inclusion within a user-defined shape, exclusion of a user-defined shape from a previously defined geographic area, the set of properties within a given distance from a location, properties corresponding to a tract or adjacent tracts, or properties currently displayed on a map image (which may be manipulated as desired, prior to user indication to lock in the defined area).

The property data grid/DB module 205 includes program code for managing the data set corresponding to a current session, including the usable and derived property data. It is configured as a database that allows the property data for the properties to be displayed in a tabular or grid format, with various sorting according to the property characteristics, economic distance, geographical distance, time, etc.

In another embodiment, FIG. 2B is a block diagram illustrating an example of a choroplethic comparison application 200B that is external to a terminal 209, which accesses the functionality of the choroplethic comparison application 200B. That is, a user device or a terminal computer may act as a terminal 209 where through either web browsing or mobile application technology the application 200B is configured to run in the context of a server or host functionality. Further, the application 200B at least includes an aggregation module 206, a user interface module 207, and an application programmable interface module 208. Furthermore, the application 200B may include any of the other modules listed in FIG. 2A. It should be understood that the same functionality may be provided using fewer, greater, or differently named modules, and the named these modules may be integrated with any of the other named modules.

In FIG. 2B, the aggregation module 206 includes program code for combining previously generated maps to derive new thematic maps that display data not shown by the previously generated maps.

The user interface module 207 includes program code for managing the display and receipt of information from a user to provide the described functionality. The user interface module 207 permits user management of the thematic and choroplethic maps, corresponding tables, and property data. Further, the user interface module permits the application 200A to be displayed in a map, menu, icon, tabular, or grid format, with various functional representations according to a module's required functionality. That is, the user interface is configured to provide mapping and analytical tools that implement the choroplethic comparison application's mapping features to display bins (color codes) across geospatial areas to show patterns. Thus, although counties in one state may be colored relative to counties nationally by default, counties may also be colored relative to counties in their state. Further, mapping features include the capability to display the boundaries of on different aggregation levels. Additionally, a table or grid of data may concurrently be displayable so that the property data and derived data may be viewed and sorted based on any desired dimension. Additionally, the rows in the table may be connected to the full database entry as well as the graphs and maps. Thus, combined with the map view, the user interface module 207 allows for a convenient yet comprehensive interactive analysis of the derived statistics and property data.

The application programmable interface module 208 is configured to communicate directly with other applications, modules, models, devices, and other sources through both physical and virtual interfaces. The application programmable interface module 208 manages the dispatching and receipt of information in relation to the above sources and sources external to the application along with integrating the application 200A with other applications and drivers, as needed per operating system. Note, each above describe module and its functionality is further described in connection with FIGS. 3-5 below.

Figure 3A:
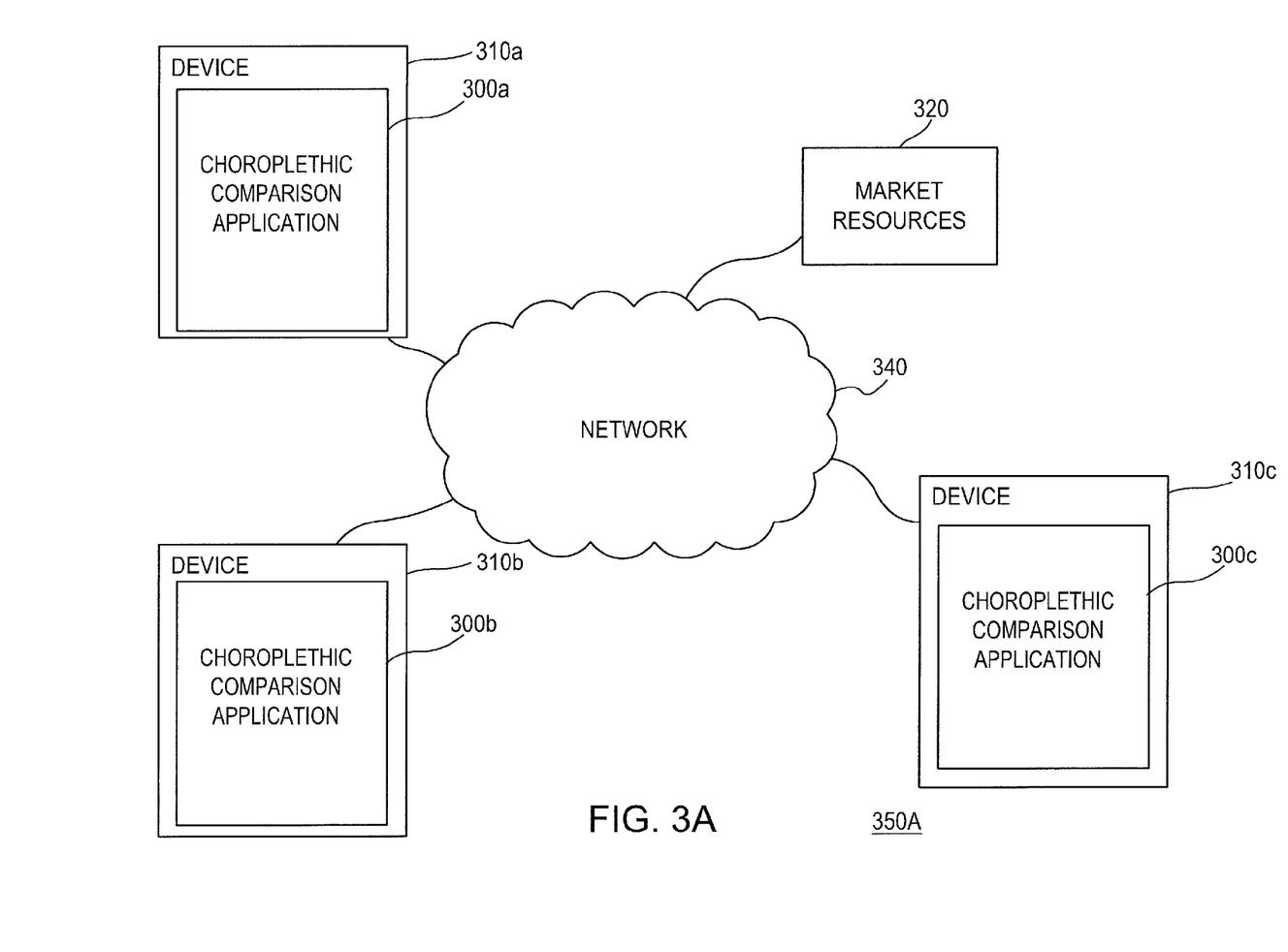
FIGS. 3A-B are block diagrams illustrating examples of systems in which a choroplethic comparison application operates.
Figure 3B:
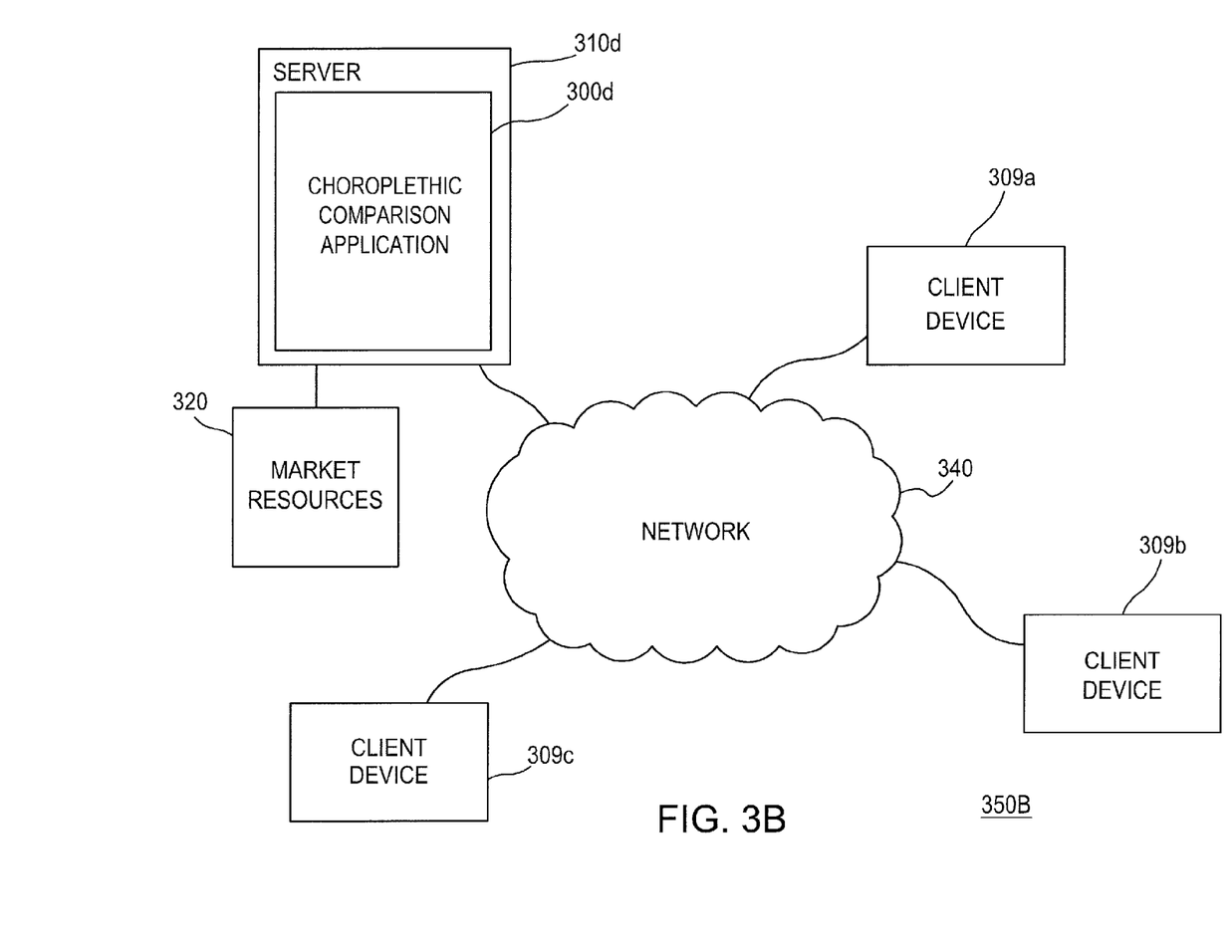

FIGS. 3A-B are block diagrams illustrating examples of systems in which a choroplethic comparison application operates. Specifically, FIG. 3 is block diagram illustrating an example of a system 350A in which the choroplethic comparison applications 300a-c operate. FIG. 3A further illustrates several devices 310a-c, each having the choroplethic comparison applications 300a-c installed thereon (see also FIG. 2A-B). The devices 310a-c are preferably terminal computers, but may alternatively be any of the computer systems described above. Similarly, the network 340 over which the devices 310a-c (through their interfaces, which are not shown) communicate preferably is a local area network; however, it may alternatively be any conventional networking technology. For instance, the network may be any of the technologies of cellular, global area network, wireless local area networks, wide area networks, local area networks, or combinations thereof, but is not limited to. Further, the interfaces of the devices 310a-c may be any interface suited for input and output of communication data, whether that communication is visual, auditory, electrical, transitive, or the like.

FIG. 3B is an illustrated alternative where client devices 309a-c may respectively access a device 310d (see also FIG. 2A-B), preferably through direct application linking, with the device 310d providing the choroplethic comparison application 300d for access by the client devices 309a-c. In this embodiment, the device 310d is preferably a server providing application access to and computing power for use by client devices 309a-c (i.e. smartphones). This would reduce the resource requirements on the client side and enhance efficiency of the system 350B. However, as another alternative, the functionality of the choroplethic comparison application 300d may be divided between the client devices 309a-c and the device 310d, where either function may be located separately on either device and accessed through distributed computing, such that the functionality is provided for, shared, and relied upon by other devices. For instance, the analytics module 203 and the property data access module 202 may be located on a device 310d, such as a server, while the map image module 204 may be located on a client device 309a, such as a tablet PC, and in support of the client device 309a generating a map image using the map image module 204, the client device 309a accesses through a network 340 the functionality of the analytics module 203 and the property data access module 202 on the device 310d. Finally, of course, a single computing device may be independently configured to include the entire functionality of the choroplethic comparison application 300d.

Additionally, as illustrated in FIGS. 3A-B, market resources 320 are shown as a singular block in the figure, but it should be understood that the singular block represents a variety of resources, including financial intuition databases, MLS listings, GIS data, or resources compiled by an information services provider (i.e. tax assessors, other appraising services, and the like). Further, market resources 320 are typically accessed externally for use by the applications, since the amount of property data is rather voluminous, and since the application is configured to allow access to multiple housing resource databases. The application accesses and retrieves the market data from these resources in support of illustrating non-obvious geographic patterns that would not otherwise be visible using the financial and housing market data alone.

Figure 4:
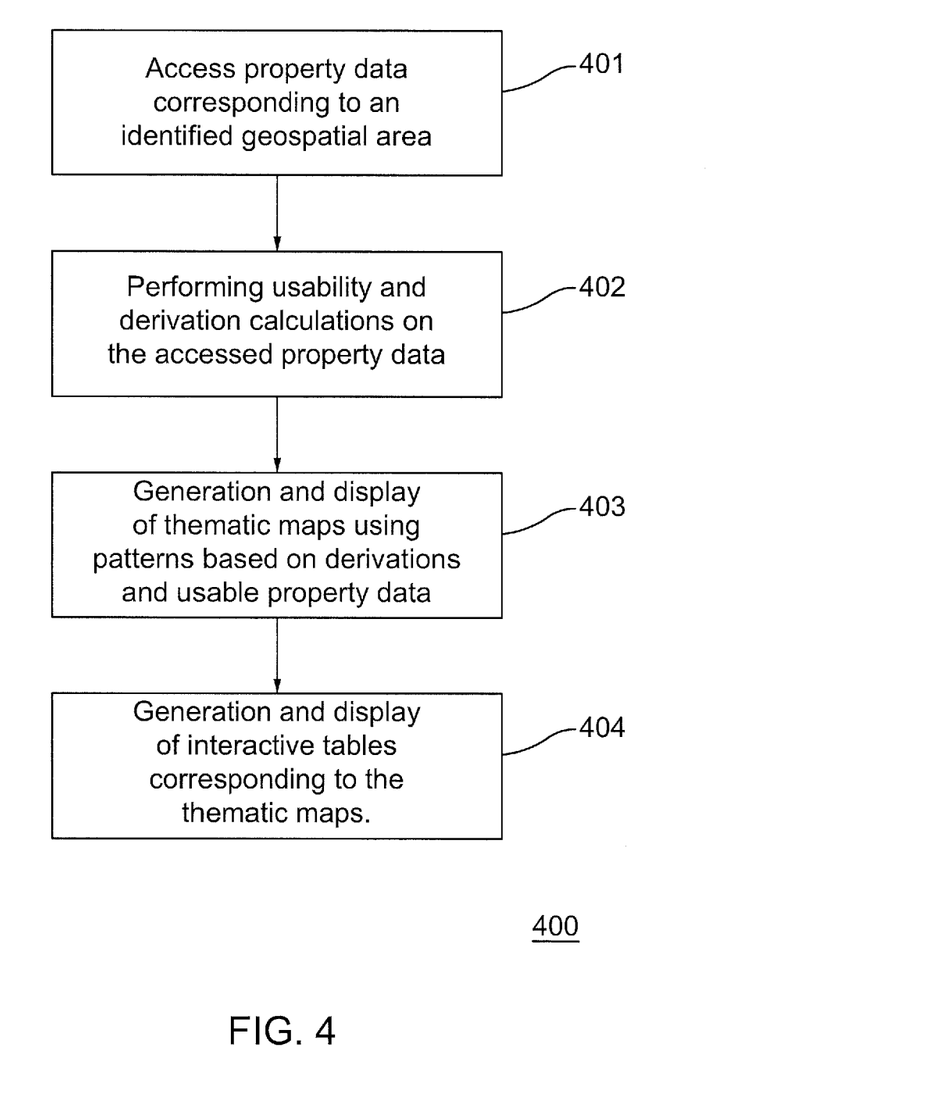
FIG. 4 is a flow diagram illustrating an example of a choroplethic comparison process.

FIG. 4 is a flow diagram illustrating an example of a choroplethic comparison process. Specifically, FIG. 4 is a flow diagram illustrating an example of the choroplethic comparison process 400 that describes one possible operation sequence for the applications 200A and 200B.

Specifically, the choroplethic comparison process 400 begins by accessing 401 the property data corresponding to an identified geospatial area. The geospatial area may be defined by an automatic neighborhood of interest selection or by user designated regions. Next, the process 400 performs 402 usability and derivation calculations on the accessed property data to clean and prepare the data for pattern display. Once the property data is 'ready,' the process 400 generates and displays 403 thematic maps using patterns based on the derivations and usable property data. Then, whether through automatic generation or user indication, the process 400 generates and displays 404 interactive tables or graphs corresponding to the thematic maps.

Figure 5:
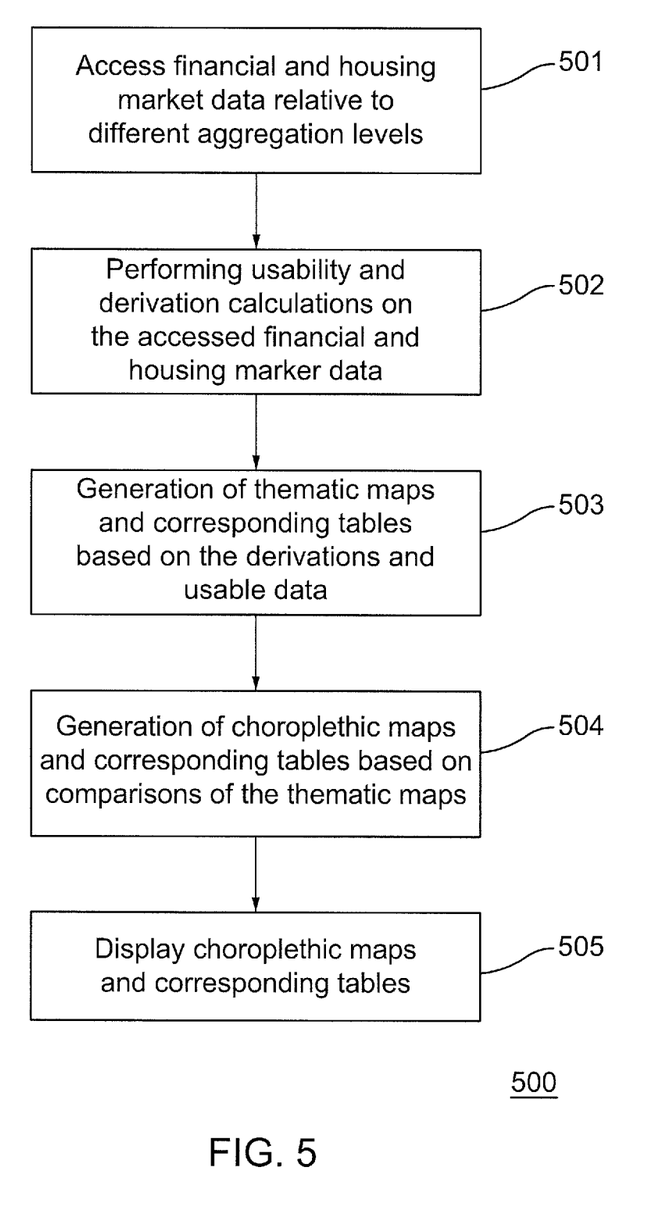
FIG. 5 is a flow diagram illustrating an example of a choroplethic comparison process.

FIG. 5 is a flow diagram illustrating an example of a choroplethic comparison process. Specifically, FIG. 5 is a flow diagram illustrating an example of the choroplethic comparison process 500 that describes one possible operation sequence for the applications 200A and 200B.

Specifically, the choroplethic comparison process 500 begins by accessing 501 financial and housing market data relative to different aggregation levels as defined above. Then, usability and derivation calculations are performed 502 on the accessed financial and housing market data. The process 500 then generates 503 thematic maps and corresponding tables based on the derivations and usable data. Next, by combining and comparing the thematic maps previously generated, the process 500 may generate choroplethic maps detailing patterns based on said combined and compared thematic maps while generating the corresponding tables. Alternatively, instead of progressing to the generation of choroplethic maps, the process 500 may skip to displaying 505 the generated thematic maps and corresponding tables, as in FIG. 4.

Thus, embodiments of the described produce and provide methods and apparatus for a model for providing real-time location-based promotions to a vehicle purchaser without the need for additional post-purchase decision conversations and signing ceremonies. Although the described is detailed considerably above with reference to certain embodiments thereof, the invention may be variously embodied without departing from the spirit or scope of the invention. Therefore, the following claims should not be limited to the description of the embodiments contained herein in any way.

The invention claimed is:

1. A non-transitory computer readable medium having computer-executable program code stored thereon, such that when the program code is executed by a computing device, it causes the computing device to:
   access property data corresponding to a geospatial area;
   generate property data statistics from the accessed property data;
   receive a user selection of at least one comparison category and at least one aggregation level that defines divisions of the geospatial area for statistical aggregation;
   determine, from the property data statistics, selected property data statistics that correspond to the divisions defined by the selected aggregation level and to the selected comparison category;
   generate and display at least one thematic map image that illustrates the divisions defined by the selected aggregation level such that their respective appearances depend on the selected property data statistics corresponding thereto;
   while the at least one thematic map image is being displayed, receive a first user selection of a first division, which is one of the divisions that is displayed in the at least one thematic map image, and in response to receiving the first user selection, automatically:
     generate a graph image that graphs the selected property data statistics that correspond to the selected comparison category and to the first division across time; and
     display the graph image together with the at least one thematic map;
   while the graph image is being displayed together with the at least one thematic map image, receive a second user selection of a second division, which is another one of the divisions that are displayed in the at least one thematic map image, and in response to receiving the second user selection, automatically:
     update the graph image such that it distinguishably graphs the selected property data statistics that correspond to the second division across time in comparison to the selected property data statistics that correspond to the first division, the selected property data statistics that correspond to the second division having not been included in the graph image prior to the updating of the graph image; and
     display the updated graph image together with the at least one thematic map.

2. The non-transitory computer readable medium of claim 1, wherein the geospatial area is alterable based on an identified statistical region.

3. The non-transitory computer readable medium of claim 1, wherein property data includes financial and housing market data, and
   wherein the accessing of the property data includes gathering financial and housing market data from an external database.

4. The non-transitory computer readable medium of claim 1, wherein the generating of the at least one thematic map image includes assigning the divisions of the selected aggregation level to a set of ordered bins based on their corresponding selected property data statistics and causing the respective appearances of the divisions to depend on the bin to which the respective division is assigned.

5. The non-transitory computer readable medium of claim 4, wherein the thematic map image includes a choroplethic housing statistic map image displaying the divisions defined by the selected aggregation level as pattern areas that are patterned in proportion to the set of ordered bins.

6. The non-transitory computer readable medium of claim 4, wherein the program code is such that when it is executed by a computing device, it causes the computing device to:
   receive a user selection of a number of bins and in response thereto automatically determine the set of ordered bins based on the selection.

7. The non-transitory computer readable medium of claim 4, wherein the program code is such that when it is executed by a computing device, it causes the computing device to:
   receive a user selection of the geospatial area and in response thereto automatically determine the set of ordered bins based on the selection such that the set of ordered bins reflects a ranking of the selected property data statistics across the geospatial area.

8. The non-transitory computer readable medium of claim 4, wherein the program code is such that when it is executed by a computing device, it causes the computing device to:
   receive a user selection of the geospatial area and in response thereto automatically determine the set of ordered bins based on the selection such that the set of ordered bins reflects a ranking of the selected property data statistics across only the geospatial area; and
   receive a user selection of a bin ranking region that encompasses the geospatial area, and in response thereto automatically update the set of ordered bins based on the selection such that the set of ordered bins reflects a ranking of the selected property data statistics across the entire bin ranking region.

9. The non-transitory computer readable medium of claim 1, wherein the generating of the property data statistics includes deriving statistics that are not directly reported by the property data.

10. The non-transitory computer readable medium of claim 9, wherein the program code is such that when it is executed by a computing device, it causes the computing device to:
    perform analytics on the property data, including performing a usability calculation on the property data to produce clean statistics.

11. The non-transitory computer readable medium of claim 1, wherein the program code is such that when it is executed by a computing device, it causes the computing device to:
    generate a table corresponding to the thematic map image.

12. The non-transitory computer readable medium of claim 1, wherein the aggregation level selected by the user is selected from a plurality of possible aggregation levels provided as options to the user, the plurality of possible aggregation levels including: the geographic aggregation levels of region, state, metropolitan statistical area, county, zip code, and census tract.

13. The non-transitory computer readable medium of claim 1,
    wherein the graph image generated in response to receiving the first user selection includes property data statistics for the geospatial area as a whole that correspond to the selected comparison category, graphed across time in distinguishable comparison with the selected property data statistics that correspond to the first division.

14. The non-transitory computer readable medium of claim 13,
    wherein the updated graph image generated in response to receiving the second user selection includes the property data statistics for the geospatial area as a whole that correspond to the selected comparison category, graphed across time in distinguishable comparison with the selected property data statistics that correspond to the first division as well as the selected property data statistics that correspond to the second division.

15. A non-transitory computer readable medium having computer-executable program code stored thereon, such that when the program code is executed by a computing device, it causes the computing device to:

access property data corresponding to a geospatial area;

generate property data statistics from the accessed property data;

receive user instructions to initiate multiple maps;

for each of the maps initiated by the user, provide the user options to select a comparison category from among a plurality of available comparison categories and an aggregation level from among a plurality of available aggregation levels that each define divisions of the geospatial area for statistical aggregation;

for each of the maps initiated by the user, in response to the user selecting a comparison category and an aggregation level for the map, determine, from the property data statistics, selected property data statistics that correspond to the divisions defined by the selected aggregation level for the map and to the selected comparison category for the map;

for each of the maps initiated by the user, generate a thematic map image that illustrates the divisions defined by the selected aggregation level for the map such that their respective appearances depend on the selected property data statistics corresponding thereto;

simultaneously display the thematic map image for each of the maps initiated by the user;

while the thematic map images are being simultaneously displayed, receive a first user selection of a first division, which is one of the divisions that is displayed in a first map image, which is one of the thematic map images being simultaneously displayed, and in response to receiving the first user selection, automatically:

generate a graph image that graphs the selected property data statistics that correspond to the selected comparison category for the first map and to the first division across time; and         display the graph image together with the thematic map images initiated by the user; and     while the graph image is being displayed together with the thematic map images, receive a second user selection of a second division, which is another one of the divisions that are displayed in the first thematic map image, and in response to receiving the second user selection, automatically:

update the graph image such that it distinguishably graphs the selected property data statistics that correspond to the second division across time in comparison to the selected property data statistics that correspond to the first division, the selected property data statistics that correspond to the second division having not been included in the graph image prior to the updating of the graph image,     wherein each of the maps may have a different comparison categories from each other.

16. The non-transitory computer readable medium of claim 15, wherein the generating of the thematic map images includes assigning the divisions of the selected aggregation level for the map to a set of ordered bins for the map based on their corresponding selected property data statistics and causing the respective appearances of the divisions illustrated in the map to depend on the bin to which the respective division is assigned.

17. The non-transitory computer readable medium of claim 15, wherein the generating of the property data statistics includes deriving statistics that are not directly reported by the property data.

18. The non-transitory computer readable medium of claim 15, wherein the plurality of available aggregation levels include: the geographic aggregation levels of region, state, metropolitan statistical area, county, zip code, and census tract.

19. The non-transitory computer readable medium of claim 15, wherein the program code is such that when it is executed by a computing device, it causes the computing device to:

for each of the maps initiated by the user, provide the user options to select a time period from among a plurality of possible time periods, where the property data statistics used to generate the thematic map image correspond to the selected time period,     wherein each of the maps may have a different time period from each other.

* * * * *